Feb. 2, 1965 J. L. GIOVINAZZO 3,168,300
AUXILIARY SPRING FOR AUTOMOTIVE VEHICLES
Filed April 5, 1961 2 Sheets-Sheet 1
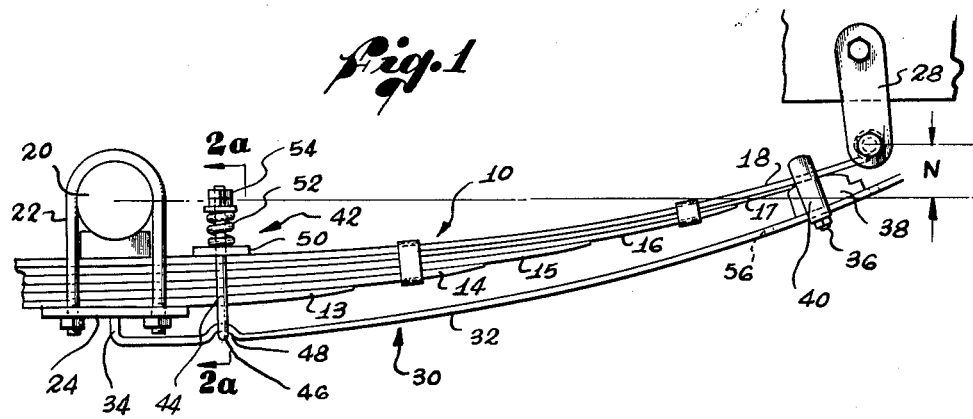
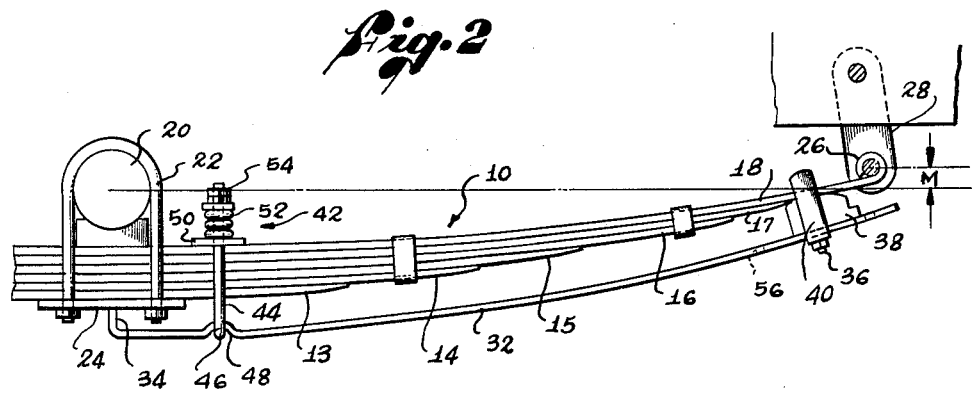
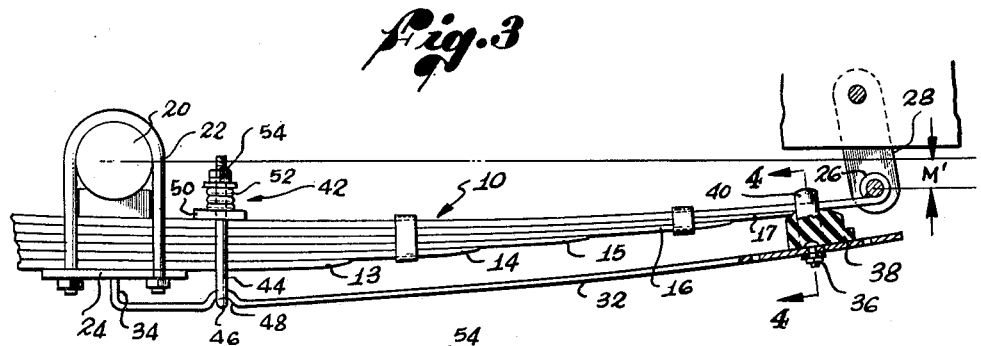
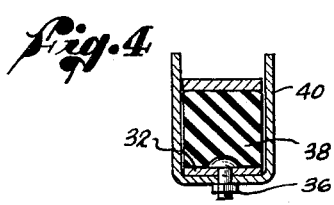
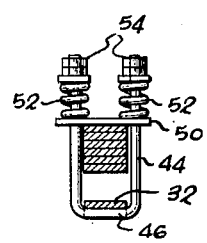
INVENTOR.
JOE L. GIOVINAZZO
BY
Attorney Feb. 2, 1965   J. L. GIOVINAZZO   3,168,300
AUXILIARY SPRING FOR AUTOMOTIVE VEHICLES
Filed April 5, 1961   2 Sheets-Sheet 2
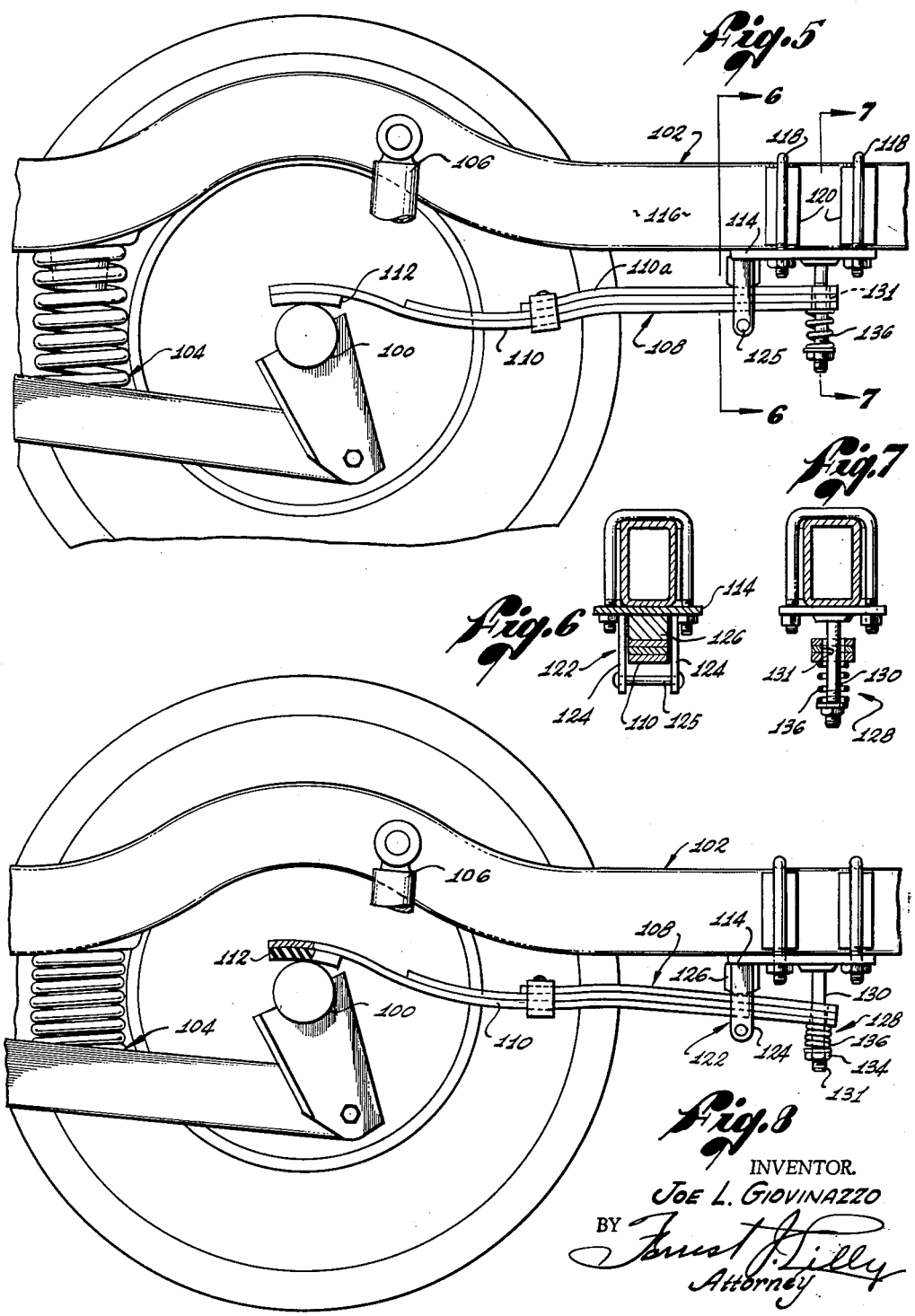
INVENTOR.
JOE L. GIOVINAZZO
BY
Attorney

United States Patent Office 3,168,300
Patented Feb. 2, 1965

3,168,300
AUXILIARY SPRING FOR AUTOMOTIVE
VEHICLES
Joe L. Giovinazzo, Los Angeles, Calif., assignor to Cambria Spring Company, Los Angeles, Calif., a corporation of California
Filed Apr. 5, 1961, Ser. No. 100,946
3 Claims. (Cl. 267—48)

This invention relates generally to spring suspension systems for automotive vehicles and the like and, more particularly, to an auxiliary spring for such suspension systems.

This application is a continuation-in-part of my copending application Serial No. 714,127 filed February 10, 1958, for Booster Spring for Automotive Vehicles and the Like, now abandoned.

As is well known in the art, spring suspension systems for automotive vehicles are designed for a particular load or load range. In other words, the greater the load-carrying capacity of a vehicle, the greater must be the stiffness of the spring suspension system of the vehicle.

In many instances, however, it is desirable and necessary to use a vehicle for transporting loads which are appreciably heavier than the design load of the vehicle's spring suspension system. This occurs most frequently in the case of light trucks, station wagons and passenger vehicles. The springs of a vehicle are excessively deflected under such increased loads, with the result that the chassis is prone to striking the rear axle of the vehicle. In cases of extreme overloading, the vehicle springs may be deflected to such a degree that the chassis of the vehicle rests directly on the axle.

Various types of auxiliary springs have been devised for reinforcing the spring suspension system of an automotive vehicle so as to enable the latter to carry additional loads. The existing auxiliary springs, however, possess certain deficiencies which are overcome by the present auxiliary spring.

Perhaps the most serious defect of the exitsing auxiliary springs resides in the fact that the vehicle on which auxiliary springs are most frequently used, namely, light trucks, station wagons and passenger vehicles, carry excessive loads only occasionally. The existing auxiliary springs, while capable of supporting these excessive loads, exert their reinforcing action on the spring suspension systems of the vehicles at all times, even when the vehicles are transporting only normal loads. As a result, vehicles equipped with the existing auxiliary springs have extremely hard rides under normal load conditions.

Further, in most cases, a pair of auxiliary springs, one at each end of the rear axle, is used. It is highly desirable that these two auxiliary springs be individually adjustable in order to enable them to be equalized or to permit compensation to be made for unbalance in the vehicle spring suspension system itself. Most of the existing auxiliary springs are incapable of adjustment in this manner.

Other deficiencies of the existing auxiliary springs reside in their relatively complex construction, high cost of manufacture, and their difficulty of installation requiring, in most cases, the services of a skilled mechanic.

With the foregoing preliminary discussion in mind, a broad object of the present invention is to provide an auxiliary spring of the character described which avoids the above noted and other deficiencies of existing auxiliary springs.

A more specific object of the invention is to provide an auxiliary spring of the character described which can be readily installed on an automotive vehicle by relatively unskilled persons without disassembly of the vehicle spring suspension system.

Another object of the invention is to provide an auxiliary spring of the character described which is quickly and easily adjustable to vary its reinforcing effect on the spring suspension system of the vehicle on which it is installed.

Another object of the invention is to provide an auxiliary spring of the character described which embodies a unique lever action to obtain an improved cushioning action under normal load conditions.

Another object of the invention is to provide an auxiliary spring of the character described which is adjustable for use in different makes of automobiles.

Another object of the invention is to provide an auxiliary spring of the character described which can be used to level an automotive vehicle whose springs are out of balance.

Other objects, advantages and features of the invention will become readily apparent as the description proceeds.

Briefly, the objects of the invention are attained by providing an auxiliary spring equipped with a spring leaf and means for pivotally mounting one end of this leaf either on the frame member or rear axle member of an automotive vehicle. The other, or free end of the leaf, engages the other member of the vehicle in such manner that when the rear axle and frame move toward one another during yielding of the vehicle springs under load, a force is exerted on the free end of the auxiliary leaf which tends to pivot the latter in one direction.

The auxiliary spring is further equipped with a limitedly yieldable or resiliently yieldable lost-motion connection between the auxiliary spring leaf, close to its pivot axis, and the member on which the leaf is pivoted. This connection accommodates limited pivotal movement of the auxiliary leaf in said one direction on its axis and thereafter prevents pivotal movement of the auxiliary leaf in this direction. Accordingly, during initial movement of the frame member and body member of the vehicle toward one another as a result of yielding of the vehicle springs under load, the connection between the auxiliary leaf and vehicle yields without appreciable bending of the auxiliary leaf. Continued pivoting of the auxiliary leaf beyond the limit permitted by the limitedly yieldable connection results in bending of the auxiliary leaf to reinforce the spring suspension system of the vehicle.

In a first, presently preferred and illustrative embodiment of the invention, the auxiliary leaf is pivotally mounted on the rear axle of the vehicle and has its free end engaged by a member connected to and movable with the frame member. In a second, modified embodiment of the invention, the auxiliary leaf is pivotally mounted on the frame member and has its free end engaging the rear axle.

The invention will be better understood from the following detailed description thereof, taken in connection with the annexed drawings, wherein:

FIG. 1 illustrates the present auxiliary spring installed on an automotive vehicle with a leaf spring suspension system;

FIG. 2 shows the spring assembly and auxiliary spring of FIG. 1 during deflection;

FIG. 2a is a section taken along line 2a—2a of FIG. 1;

FIG. 3 is a view similar to FIG. 2 illustrating the action of the auxiliary spring in FIG. 1 when adjusted for increased loads;

FIG. 4 is an enlarged section taken along line 4—4 of FIG. 3;

FIG. 5 illustrates the alternative form of the present auxiliary spring;

FIG. 6 is a section taken along line 6—6 of FIG. 5;
FIG. 7 is a section taken along line 7—7 of FIG. 5; and
FIG. 8 illustrates the auxiliary spring of FIG. 5 during yielding of the vehicle spring under load.

Referring now to these drawings, the numeral 10 denotes one rear leaf spring assembly of a conventional passenger car. This assembly comprises, in the usual manner, a series of spring leaves 13 through 18 of different lengths. The leaf spring assembly 10 is supported on the rear axle 20 of the vehicle by means of a pair of U-shaped bolts 2 (only one shown) which engage over the axle 20 and are fixed to a pressure plate 24 at their lower ends. The center of the leaf spring assembly 10 is received between the plate 24 and the rear axle 20 and is held tightly against the latter by the plate.

The forward and rear ends of the upper, main leaf 18 of the spring assembly 10 are cylindrically bent to form bearing portions 26 (only one shown). These bearing portions are hingably connected to the chassis of the vehicle by pivotal links 28 (only one shown).

The auxiliary spring 30 of this invention comprises a spring leaf 32 having a length approximately equal to one-half the length of the upper leaf 18 in the spring assembly 10. The left-hand or forward end of the auxiliary leaf 32 is bent upwardly to form a right-angle flange or fulcrum 34 which, in the assembled position of the auxiliary spring, engages the plate 24 directly below the rear axle 20. Fixed to the upper side of the right-hand or rear end of the auxiliary leaf 32 by means of bolt 36 is a rubber pad 38. This pad bears against the underside of the upper leaf 18 of the spring assembly 10 adjacent the rear end of the latter leaf.

In order to avoid lateral shifting of the rear end of the auxilairy leaf 32 with respect to the spring assembly 10, a U-shaped bracket 40 is fixed to the rear end of the auxiliary leaf and extends upwardly therefrom to straddle the main leaf 18. For convenience, the bracket 40 may be secured to the auxiliary leaf 32 by means of the pad-attaching bolt 36, as shown.

The auxiliary spring 30 is connected to the spring assembly 10 by a resiliently yieldable last-motion connection consisting of a shackle or bracket assembly 42. This bracket assembly comprises a generally U-shaped bolt 44, the lower bight portion 46 of which extends transversely across the underside of the auxiliary leaf 32 within a transverse channel 48 in the leaf. This channel may be formed in various ways, such as by bending the auxiliary leaf to the configuration shown.

The legs of the bolt 44 extend upwardly from the auxiliary leaf 32 and straddle the several leaf springs of the spring assembly 10. The upper ends of these bolt legs project a distance above the main leaf 18 of the spring assembly for receiving an apertured pressure plate 50. This plate extends across and is engagable with the upper surface of the main leaf 18 of the spring assembly.

Encircling the legs of the bolt 44 above the pressure plate 50 are a pair of coil compression springs 52. These coil compression springs are backed up by stop nuts 54, threaded on the upper ends of the bolt legs. The combined spring constant of these coil springs 52 is appreciably less than the spring constant of the auxiliary leaf 32. Moreover, it will be observed that bolt 44 engages the auxiliary leaf 32 closely adjacent to its forward or fulcrum end, so that a given downward force exerted on the rear end of the auxiliary leaf 32 results in an appreciably greater downward force on the bolt 44, tending to compress the coil springs 52.

When installing the present auxiliary spring on an automotive vehicle, the rear end of the vehicle is jacked up until the wheels clear the ground, so as to enable the spring leaves of the spring assembly 10 to assume a more arcuate configuration conforming to the normal, untensed arcuate configuration of the auxiliary leaf 32. After removing the pressure plate 50, coil springs 52 and stop nuts 54 from the bolt 44, the auxiliary leaf is placed in position against the underside of the spring assembly. Finally, the bolt 44 is located in the position shown, and the pressure plate 50, coil springs 52, and stop nuts 54 are reassembled on the bolt. The facility with which the present auxiliary spring may be installed on a vehicle by relatively unskilled persons will be readily apparent from the above discussion.

Under normal loading conditions on the vehicle, the stop nuts 54 are backed off approximately to the positions shown in FIGS. 1 and 2, so as to relieve the tension of coil springs 52. Under these conditions, flexing of the main leaf 18 of the spring assembly results in the application of a downward force on the rear end of the auxiliary leaf 32 through the pad 38. It will be observed that the auxiliary leaf 32 comprises, in effect, a second-class lever having its fulcrum, formed by the flange 34, along the forward end of the lever or leaf. The downward force, just mentioned, exerted on the rear end of this lever by the leaf 18 of the spring assembly is resisted by the upward force exerted on the leaf, adjacent the fulcrum 34, by the coil springs 52.

Owing to the greater length of the lever arm of the downward force, as compared with the lever arm of the upward force exerted by coil springs 52, a given downward force on the rear end of the leaf 32 results in the exertion of an appreciably greater downward force on the bolt 44, tending to compress the springs 52. Because of this fact and the low spring constant of the coil springs 52 as compared with the spring constant of the auxiliary leaf 32, the latter remains relatively undeflected under the action of the downward force on the rear end thereof, and merely pivots about its fulcrum 34 with resultant compression of the coil springs 52, as illustrated in FIG. 2. The stiffness of the springs 52 is such as to not appreciably adversely affect the cushioning characteristics of the spring assembly 10 under normal load conditions.

When a load substantially in excess of the normal load-carrying capacity of the vehicle is to be carried, stop nuts 54 are tightened to compress the coil springs 52 until the adjacent turns of the springs are just about in contact or actually touch one another, depending on the magnitude of the load. When the turns of the springs 52 contact one another, of which, the latter springs are incapable of further compression. Under these conditions, the bracket 42 forms, in effect, a rigid, unyielding connection between the auxiliary leaf 32 and the spring assembly 10. Accordingly, with the auxiliary spring adjusted for overloads, the downward force exerted on the rear end of the auxiliary leaf 32 by flexing of the main leaf 18 of the spring assembly can cause only flexing of the auxiliary leaf, as illustrated in FIG. 3. The stiffness of the auxiliary leaf 32 is, therefore, added to the spring assembly to resist excessive flexing of the suspension system under the greater loads.

It will be seen that by properly adjusting the lost motion of the lost-motion connection, by means of adjusting the stop nuts 54 to a position between their completely backed off and completely tightened positions, an adjustment of the auxiliary spring can be obtained wherein the auxiliary leaf 32 will act to bolster the spring assembly 10 upon predetermined deflection of the leaf spring assembly. This may be desirable, for example, in the case of a medium overload, wherein it is desirable to bring the added stiffness of the auxiliary leaf 32 into play only in cases of sudden impact loads, such as are caused by the vehicle striking a bump in the road.

It will be obvious, of course, that a pair of auxiliary springs, one on each of the rear spring assemblies, will be mounted on an automotive vehicle. The adjustment afforded by the stop nuts 54 enables any unbalance in the two rear spring assemblies of the vehicle to be compensated. That is, if one rear spring assembly is slightly weaker than the other assembly, so that the car leans to one side, the auxiliary spring on the weaker spring assembly may be tightened more than the other auxiliary spring, so as to return the vehicle to its normal level position.

Owing to the engagement of the auxiliary spring with the extreme rear ends of the spring assemblies, the mass of the vehicle is redistributed in a fore and aft direction so as to compensate, for example, for increased loads on the rear end of the vehicle. In order to adapt the present auxiliary spring for installation on different makes of motor vehicles, which have spring assemblies of different lengths, the auxiliary leaf 32 may be provided with additional openings, such as indicated at 56, for receiving the pad and bracket attaching bolt 36. This permits the position of the pad 38 and bracket 40 to be adjusted along the auxiliary leaf in accordance with the length of the springs in a particular spring assembly.

Reference is now made to FIGS. 5–8 illustrating the alternative form of the present auxiliary spring. In these figures, the numeral 100 denotes the rear axle of an automotive vehicle and the numeral 102 denotes the frame. Frame 102 is supported on axle 100 by a coil spring suspension system generally designated by the numeral 104. A shock absorber 106, only partially illustrated, may be connected between each end of the axle and the frame 102.

The auxiliary spring 108 may comprise only one spring leaf 110 or a plurality of spring leaves 110a, as illustrated, depending on the auxiliary spring action required. One end of spring leaf 110, the free end, mounts a pad 112 which seats against the top side of the rear axle 100.

The other end of the auxiliary spring is mounted on the frame 102 of the vehicle, as follows: Indicated at 114 is a mounting plate which seats against and is secured to the underside of a side member 116 of frame 102 by shackle bolts 118. Blocks 120 of wood or other cushioning material may be placed between the shackle bolts and frame member 116, as shown.

Indicated at 122 is a pivot means for pivotally supporting the auxiliary spring 108 on the supporting plate 114. The pivot means 122 comprise a pair of downwardly depending members 124 which are welded at their upper ends to the mounting plate 114. The lower ends of these members are joined by a rivet 125. Fixed to the mounting plate 114 and disposed between the upper ends of the members 124 is a fulcrum or pivot block 126. The leaf springs 110a pass between the members 124 of the pivot means 122 and seat against the pivot block 126 at a position spaced from the extreme right-hand end of the springs. The pivot means 122, therefore, rockably supports the spring leaves 110a for pivoting of the latter on a transverse axis parallel to the side faces of the springs.

From the description thus far, it is evident that the vehicle spring suspension system 104 permits movement of the frame 102 and rear axle 100 toward and away from one another and that during movement of these members toward one another, the auxiliary spring leaves 110a pivot in a clockwise direction on the pivot means 122. Indicated at 128 is a limitedly yieldable or resiliently yieldable lost-motion connection between the auxiliary spring leaves 110a and frame member 116 which accommodates limited pivotal movement of the auxiliary spring in the clockwise direction on the pivot means 122 and which thereafter prevents clockwise pivoting of the auxiliary spring. This connection comprises a post 130 which is rigidly fixed at its upper end to the mounting plate 114 and depends downwardly therefrom. This post passes loosely through an enlarged hole 131 in the spring leaves 110a, which hole is located between the pivot means 122 and the extreme right-hand edge of the springs. A shoulder-forming nut 134 is threaded on the lower end of the post 130. Mounted on this post, between the right-hand end of the springs 110a and the nut 134, is a coil spring 136.

From this description, it is evident that the coil spring 136 yieldably resists clockwise pivoting of the auxiliary spring leaves 110a on the pivot means 122. As in the previous form of the invention, the coil spring 136 preferably has a low spring rate as compared with that of the auxiliary spring to afford a cushioned ride under normal load conditions. It is further evident that when the auxiliary spring leaves 110a are pivoted to the position of FIG. 8, the coils of the spring 136 are in contact with one another and thereby prevent further clockwise pivoting of the auxiliary spring.

The parts of the present auxiliary spring are designed so that under normal loading of the automotive vehicle, the leaves of the auxiliary spring 108 will be unbent and the coil spring 136 will be partially compressed. As the vehicle is loaded, the axle 100 and frame 102 approach one another and thereby produce clockwise pivoting of the auxiliary spring leaves on the pivot means 122. This pivoting is resisted by the coil spring 136. However, because of the low spring rate of this coil spring with respect to that of the auxiliary spring leaves 110a, the coil spring merely compresses without bending of the auxiliary spring leaves. After partial deflection of the vehicle spring suspension system 104, the coils of the coil spring 136 engage one another to prevent further pivoting of the auxiliary spring leaves on the pivot means. Further movement of the axle and vehicle frame toward one another, due to additional loading of the vehicle, then produces bending of the spring leaves 110a of the auxiliary spring, which bending reinforces the spring suspension system of the vehicle.

Thus, as in the previous form of the invention, the auxiliary spring 108 becomes effective to reinforce the vehicle spring suspension system only after partial deflection of the system. Accordingly, under normal load conditions, the vehicle is afforded with a soft ride and the auxiliary spring does not become effective to reinforce the springs of the vehicle until the latter is loaded beyond its normal capacity.

Clearly, there have been described and illustrated two auxiliary springs which are fully capable of attaining the objects and advantages preliminarily set forth.

While two presently preferred embodiments of the invention have been disclosed for illustrative purposes, it will be readily apparent that numerous modifications in the design and arrangement of parts of the invention are possible within the scope of the following claims.

What is claimed is:

1. In an automotive vehicle including an axle, a frame over said axle, and a leaf spring assembly secured at its center to said axle and at its ends to said frame, the improvements comprising an auxiliary spring leaf extending along the underside of said leaf spring assembly from said axle to one end of the leaf spring assembly, fulcrum means pivotally supporting one end of said auxiliary leaf on the underside of said leaf spring assembly below said axle for pivoting of the leaf in a vertical plane, means on the other end of said auxiliary leaf engaging said one end of said leaf spring assembly, and a limitedly yieldable lost-motion connection between said leaf spring assembly and said auxiliary leaf close to said fulcrum means which resiliently yields a fixed distance to accommodate limited downward pivoting of said auxiliary leaf without appreciable bending and is thereafter positively restrained against yielding, whereby said auxiliary leaf bends to reinforce said leaf spring assembly only after partial deflection of said assembly.

2. The subject matter of claim 1 wherein said connection comprises a U-bolt arranged with its crosspiece seating against the underside of said auxiliary leaf and its legs straddling said leaf spring assembly, a pressure plate slidable in said legs and seating against the upper side of said assembly, coil springs on said legs seating at one end against said plate, and nuts threaded on said legs and seating against the other ends of said springs, respectively.

3. An auxiliary spring for an automotive vehicle having a leaf spring suspension assembly, comprising an auxiliary leaf spring, a right-angle portion at one end of said auxiliary leaf forming a fulcrum projecting beyond one face of the auxiliary leaf, said fulcrum having a fulcrum edge substantially paralleling said one face, a pad on said one face of the auxiliary leaf adjacent the other end of the latter, a U-shaped bolt having its cross-piece extending across the other face of the auxiliary leaf adjacent said fulcrum but spaced from the latter in the direction of the other end of said auxiliary leaf, said other face of said auxiliary leaf having a transverse channel seating said crosspiece, the legs of said bolt straddling and extending beyond said one face of said auxiliary leaf, a pressure plate opposite said one face of said auxiliary leaf and slidably on said legs toward and away fraom said one face, coil springs on said legs between said plate and the ends of said legs, and stop nuts threaded on the ends of said legs.

References Cited in the file of this patent

UNITED STATES PATENTS

| | | |
|---|---|---|
| 2,301,398 | Haynes | Nov. 10, 1942 |
| 2,954,970 | Bernard et al. | Oct. 4, 1960 |
| 2,973,196 | Scheublein et al. | Feb. 28, 1961 |

FOREIGN PATENTS

| | | |
|---|---|---|
| 397,951 | Great Britain | Sept. 7, 1933 |
| 622,104 | France | July 24, 1926 |